United States Patent
Shiotsu et al.

(10) Patent No.: US 7,142,204 B2
(45) Date of Patent: Nov. 28, 2006

(54) PORTABLE INFORMATION PROCESSING DEVICE

(75) Inventors: Shinichi Shiotsu, Kawasaki (JP); Isamu Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 362 days.

(21) Appl. No.: 10/125,517

(22) Filed: Apr. 19, 2002

(65) Prior Publication Data

US 2003/0142087 A1 Jul. 31, 2003

(30) Foreign Application Priority Data

Jan. 28, 2002 (JP) .............................. 2002-018537

(51) Int. Cl.
*G09G 5/00* (2006.01)
*H04M 1/00* (2006.01)

(52) U.S. Cl. .................. 345/211; 455/566; 455/574

(58) Field of Classification Search ................ 345/211; 348/158, 558; 455/566, 574; 713/320
See application file for complete search history.

(56) References Cited

U.S. PATENT DOCUMENTS

| 5,949,484 A * | 9/1999 | Nakaya et al. ........... 348/384.1 |
| 6,313,832 B1 * | 11/2001 | Ishida ........................ 345/211 |
| 6,335,762 B1 * | 1/2002 | Lee ............................ 348/558 |
| 6,483,547 B1 * | 11/2002 | Eyer .......................... 348/473 |
| 6,710,578 B1 * | 3/2004 | Sklovsky .................... 320/127 |
| 6,738,649 B1 * | 5/2004 | Suzuki ....................... 455/574 |
| 2002/0186214 A1* | 12/2002 | Siwinsi ..................... 345/212 |
| 2003/0020700 A1* | 1/2003 | Danis ........................ 345/204 |

FOREIGN PATENT DOCUMENTS

| JP | 07-162784 | 6/1995 |
| JP | 07-281798 | 10/1995 |
| JP | 10-187297 | 7/1998 |
| JP | 11-018020 | 1/1999 |
| JP | 11-143594 | 5/1999 |
| JP | 11-143595 | 5/1999 |
| JP | 2000-050179 | 2/2000 |

* cited by examiner

*Primary Examiner*—Alexander Eisen
(74) *Attorney, Agent, or Firm*—Staas & Halsey LLP (57) ABSTRACT

In portable information processing devices, such as notebook computers, that can run on batteries and are capable of receiving digital broadcasting, enable setting an optimal operating state by predicting, in accordance with digital-broadcast reception status, how long listening and viewing will be possible. Furnished are: a signal-processing component; an image-quality determining component; a remaining-capacity detection component an optimal-operation specifying component; and a notification component.

13 Claims, 7 Drawing Sheets

Potential View Time Remaining: SDTV → 5 hrs.
                                HDTV → 1 hr.

| Time Slot | Ch1 | Ch2 | Ch3 | Ch4 |
|---|---|---|---|---|
| 10:00 | News (SD) | Sports (HD) | Drama (SD) | Cartoon(HD) |
| 11:00 | Sports (HD) | News (HD) | Drama (SD) | Drama (SD) |
| 12:00 | Drama (SD) | Drama (HD) | Drama (SD) | Drama (SD) |

PORTABLE INFORMATION PROCESSING DEVICE

BACKGROUND OF THE INVENTION

1. Technical Field

The present invention relates to personal computers and other portable information processing devices provided with functionality for receiving digital television broadcasts.

2. Description of Related Art

In recent years personal computers (PCs) outfitted with television-broadcast receiving functionality have begun to gain popularity. At present equipping desktop personal computers with television functionality has become common, but when digital terrestrial TV broadcasting is launched in 2003 (in Japan), equipping mobile terminals such as notebook PCs with television functionality in order to be able to view a relatively high-quality TV picture while on the go is anticipated.

In digital terrestrial TV broadcasting, a single channel is apportioned into thirteen segments, and by combining these segments, program-multiplexing a maximum of three programs is possible. Various services, such as for example simultaneously broadcasting three programs whose image quality (resolution) corresponds to SDTV (Standard Definition TV) programs, or broadcasting only a single program whose image quality corresponds to HDTV (High Definition TV) programs, are scheduled to be implemented.

Figure 7:
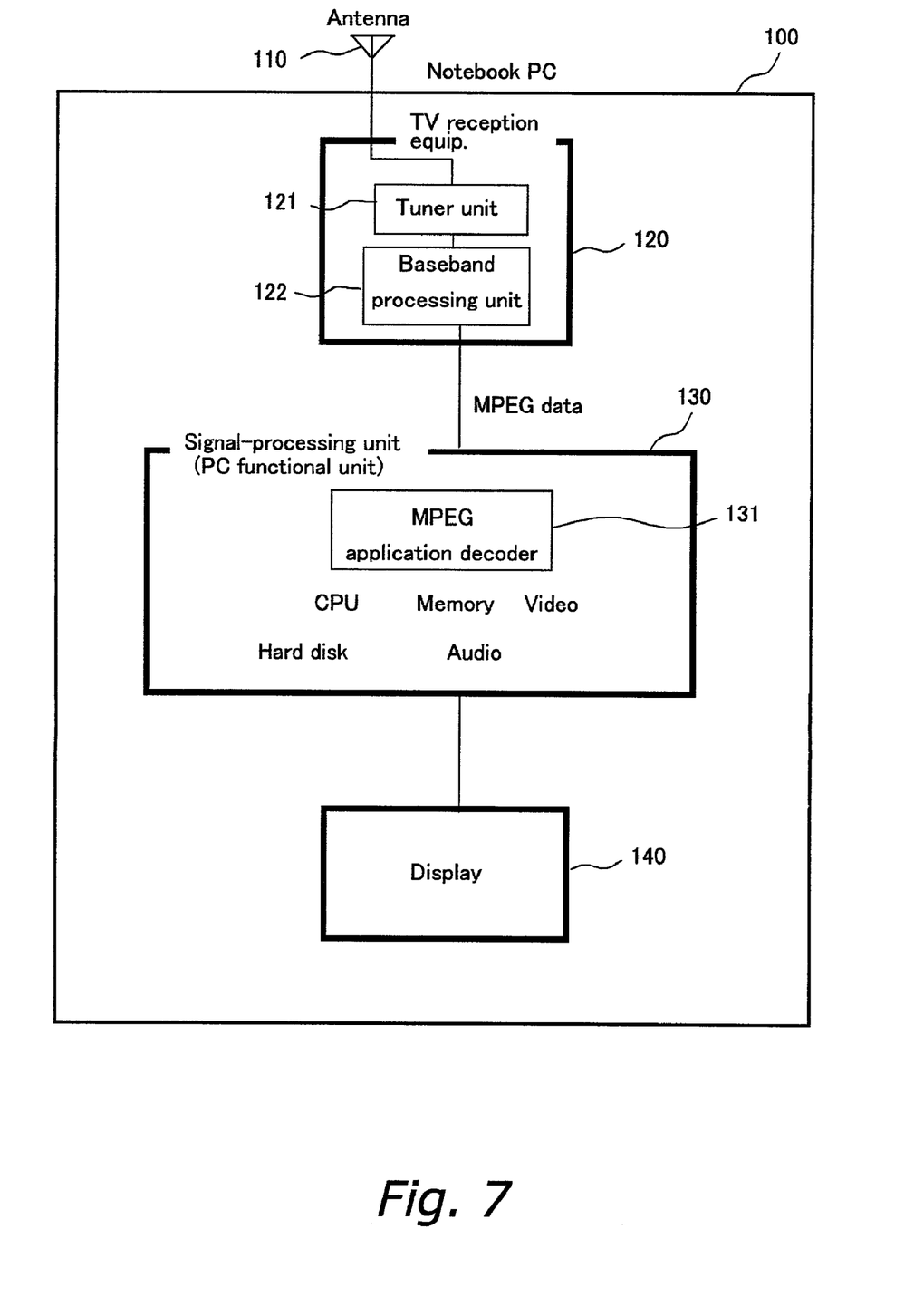
FIG. 7 is a block diagram of control operations in the prior art.

An example of television functionality installed in a notebook PC is illustrated in FIG. 7.

Herein, notebook PC 100 is equipped with, among other components, an antenna 110 for receiving data signals from digital terrestrial TV broadcasting, a TV reception module 120, a signal-processing unit 130 that restitutes received data signals into image data, and a display unit 140 for displaying the image data.

TV reception module 120 includes a tuning unit 121, and a baseband processing unit 122 that demodulates the received signals and converts them into MPEG data. Likewise, the signal-processing unit 130 is equipped with an MPEG decoding unit 131 for decoding into image data MPEG data sent out from the TV reception module 120.

In order to perform ordinary PC functions, the notebook PC 100 is furnished with functional components such as a CPU and memory, a recording medium drive such as a hard disk, and a video playing module and an audio playing module.

A problem with this sort of notebook PC 100 has been that in situations in which it is run on battery drive-such as at a trip destination where its AC adapter cannot be plugged in-the battery dies while watching a program, making listening and viewing impossible. Moreover, because power consumption in performing the decoding process in the signal-processing unit 130 varies drastically depending on the channel, owing to differing SDTV, HDTV, etc. image quality depending on the channel, predicting according to the remaining battery capacity how long listening and viewing is possible has been difficult.

SUMMARY OF THE INVENTION

An object of the present invention is in portable information processing devices, such as notebook computers, that can run on batteries and are capable of receiving digital broadcasting, to enable setting an optimal operating state by predicting, in accordance with digital-broadcast reception status, how long listening and viewing is possible.

A portable information-processing device of the present invention comprises:

digital-broadcast reception means for receiving digital-broadcasting data signals;

signal-processing means for decoding into image data data signals received by the digital-broadcast reception means;

image-quality determining means for determining image quality of the data signals received by the digital-broadcast reception means;

remaining-capacity detection means for detecting remaining capacity of a battery supplying a source of electricity to the device main unit;

optimal-operation specifying means for, based on determination results from the image-quality determining means and detection results from the remaining-capacity detection means, determining the optimal operating state that should be currently selected; and notification means for reporting the resulting determination by the optimal-operation specifying means.

Here, the optimal-operation specifying means can be configured to forecast potential viewing duration based on determination results from the image-quality determining means and detection results from the remaining-capacity detection means, and select an optimal operating state from a pre-established operating-state table.

Also, the image-quality determining means can be configured to determine image quality by referring to EPG information contained within the data signals received by the digital-broadcast reception means.

Further, the image-quality determining means can be configured to determine image quality from image data decoded by the signal-processing means.

A portable information-processing device of the present invention comprises:

digital-broadcast reception means for receiving digital-broadcasting data signals;

signal-processing means for decoding into image data data signals received by the digital-broadcast reception means;

image-quality determining means for determining image quality of the data signals received by the digital-broadcast reception means;

remaining-capacity detection means for detecting remaining capacity of a battery supplying a source of electricity to the device main unit;

optimal-operation specifying means for, based on determination results from the image-quality determining means and detection results from the remaining-capacity detection means, deciding on an operating state for optimizing power consumption; and a power control means for setting the device main unit into the operating state decided on by the optimal-operation specifying means.

Here, the optimal-operation specifying means can be configured to forecast potential viewing duration based on determination results from the image-quality determining means and detection results from the remaining-capacity detection means, and if the forecast potential viewing duration is below a predetermined value, select an operating state for receiving a lesser-power-consuming program of lower image quality.

Also, the optimal-operation specifying means can be configured to forecast, from EPG information in programs the digital-broadcast reception means can receive, power consumption for each of the programs, and based on results of the forecast select a program to be received.

The portable information-processing device is further furnished with data storage means for storing data signals received by the digital-broadcast reception means; wherein:

the optimal-operation specifying means forecasts potential viewing duration based on determination results from the image-quality determining means and detection results from the remaining-capacity detection means, and if the forecast potential viewing duration is below a predetermined value, suspends operation of the signal-processing means and selects a recording mode that stores data signals received by the digital-broadcast reception means into the data storage means.

The portable information-processing device is further furnished with data playback means for playing back predetermined image data; wherein:

the optimal-operation specifying means forecasts potential viewing duration based on determination results from the image-quality determining means and detection results from the remaining-capacity detection means, and if the forecast potential viewing duration is below a predetermined value, suspends operation of the digital-broadcast reception means and the signal-processing means, and selects a play mode in which by playing back image data by the data play back means and displaying on a display means.

The portable information-processing device is further furnished with data storage means for storing data signals received by the digital-broadcast reception means; wherein the data playback means play back data signals stored in the data storage means.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Embodiments of Invention

Configurational Overview

Figure 1:
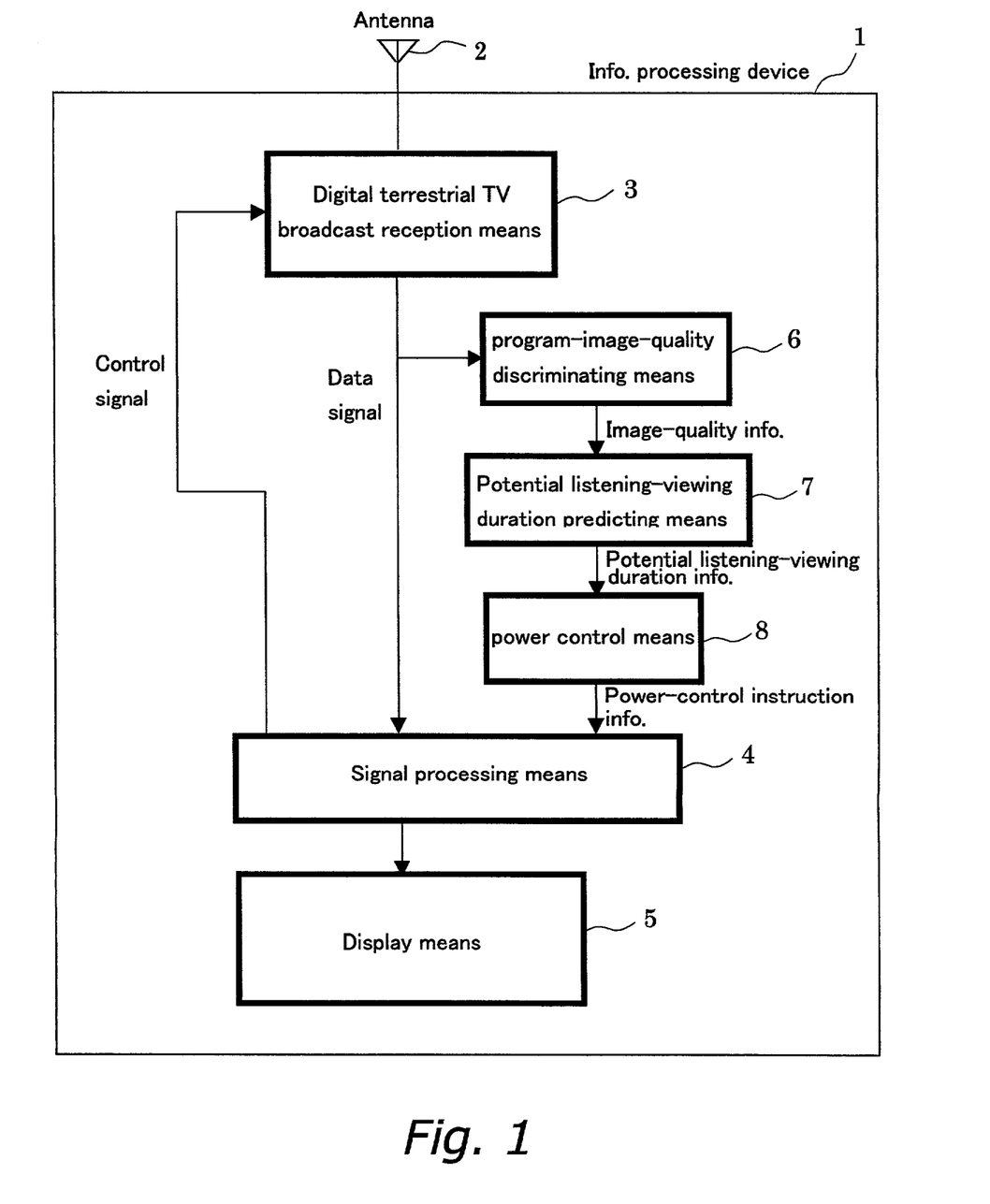
FIG. 1 is a configurational outline diagram illustrating principles of the present invention.

A block diagram sketching the configuration in principle of a portable information processing device having to do with the present invention is shown in FIG. 1.

Information processing device 1 is equipped with an antenna 2 for receiving data signals through digital terrestrial TV broadcasting, and a digital terrestrial TV broadcast reception means 3. The digital terrestrial TV broadcast reception means 3 is equipped with a tuner unit, a demodulator, and like components, and demodulates into MPEG data modulated waves that are received.

The information processing device 1 is also furnished with a signal processing means 4 for converting data signals received by the digital terrestrial TV broadcast reception means 3 into image data. The signal processing means 4 is furnished with an MPEG decoding unit, and restitutes sound data and image data contained within the MPEG data.

The information processing device 1 is further furnished with display means 5 for displaying image data restituted by the signal processing means 4. A flat-panel display device such as a liquid-crystal display panel or a plasma display may be utilized as the display means 5.

The information processing device 1 is further furnished with: a program-image-quality determining means 6 for determining image quality through received data signals; potential-viewing-duration predicting means 7 for predicting potential viewing duration based on image quality; and power control means 8 for controlling electric power based on the predicted potential viewing duration.

The program-image-quality determining means 6 is configured to determine the image quality of the program, from for example electronic program guide (EPG) information contained in the received data signal. The potential-viewing-duration predicting means 7 determines potential viewing duration through computational operations on the battery capacity remaining and the image quality information for the program being received. The power control means 8 controls power based on the potential viewing duration found, and, if it is judged that the potential viewing duration is below a predetermined value, switches to receiving programs of lower image quality, or else changes the operating state so as to lessen the power consumption.

First Embodiment

Figure 2:
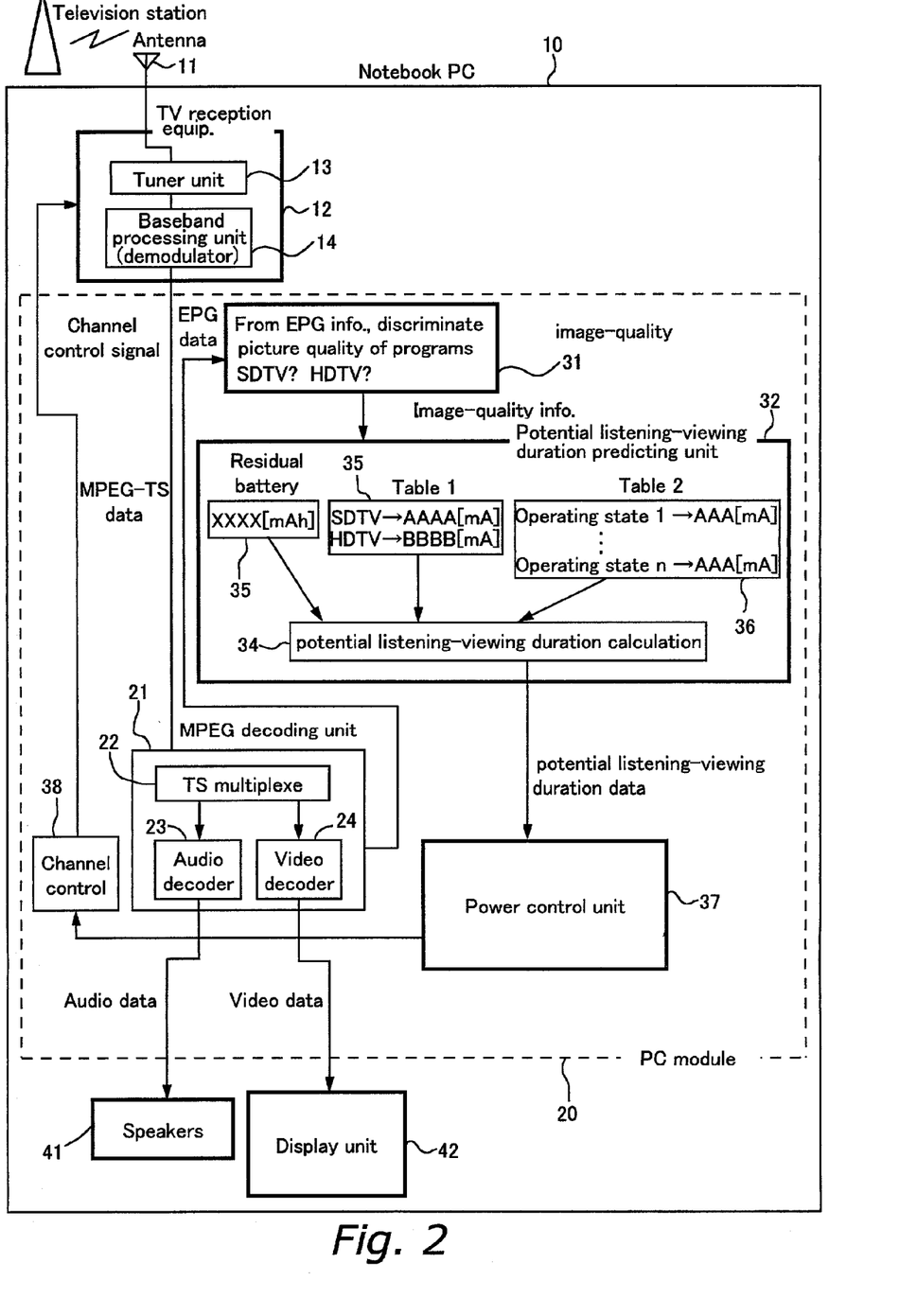
FIG. 2 is a block diagram of control operations in the first embodiment.

A portable information-processing device in which a first embodiment of the present invention is adopted is illustrated in FIG. 2. Herein, an example in which a wireless-digital-television receiving module 12 for receiving television broadcasts is installed into a notebook PC 10 is illustrated.

For receiving data signals from digital terrestrial TV broadcasts, the notebook PC 10 is equipped with an antenna 11 and the TV reception module 12. The TV reception module 12 is equipped with a tuner unit 13 and a baseband processing unit 14, to demodulate into MPEG data modulated waves that are received.

The MPEG data demodulated by the TV reception module 12 is sent out to a PC module 20 that executes signal processing.

The PC module is equipped with: an MPEG decoding unit 21 that restitutes MPEG data into image data; an image-quality determining unit 31 that determines the image quality of received data signals; a potential-viewing-duration predicting unit 32; a power control unit 37; and a channel control unit 38; among other units.

The MPEG decoding unit 21 is equipped with: a TS multiplexer 22 that separates MPEG transport streams (MPEG-TS data) into audio information and video information; and an audio decoder 23 for decoding audio information and a video decoder 24 for decoding video information, among the separated information. Audio data decoded by the audio decoder 23 is output via speakers 41, and video data decoded by the video decoder 24 is displayed on a display unit 42 such as a liquid-crystal panel. Further, electronic program guide (EPG) information that is multiplexed into the MPEG-TS data is extracted by the MPEG decoding unit 21 and input to the image-quality determining unit 31.

Based on the EPG information sent out from the MPEG decoding unit 21, the image-quality determining unit 31 determines whether the image quality of a program being received is SDTV-correlative picture quality, or is HDTV-correlative picture quality. Picture-quality information determined by the image-quality determining unit 31 is input to the potential-viewing-duration predicting unit 32.

The potential-viewing-duration predicting unit 32 is equipped with a residual-battery-information acquisition unit 33 that acquires remaining battery capacity information, and a potential-viewing-duration calculating unit 34. The potential-viewing-duration calculating unit 34, based on image-quality information input from the image-quality determining unit 31 and on remaining battery capacity information acquired by the residual-battery-information acquisition unit 33, calculates potential viewing duration for a program currently being received; and power consumption required for decoding in instances respectively in which the image quality is SDTV-correlative, and in which the image quality is HDTV-correlative is stored in advance as a first table 35, which enables a configuration such that the potential viewing duration may be specified by referring to the first table 35. The potential viewing duration data calculated by the potential-viewing-duration calculating unit 34 is sent out to the power control unit 37.

The power control unit 37, based on the potential viewing duration data input from the potential-viewing-duration predicting unit 32, generates a control signal that is for lessening the power consumption; and if the potential viewing duration is under a predetermined value in an instance in which the image quality of a data signal being received is high for example, the power control unit 37 is configured to output a channel-change demand to switch to a lower-image-quality channel.

The channel control unit 38 generates a channel-control signal based on the channel-change demand input from the power control unit 37, and switch-controls the channels that the TV reception module 12 receives.

Figure 3:
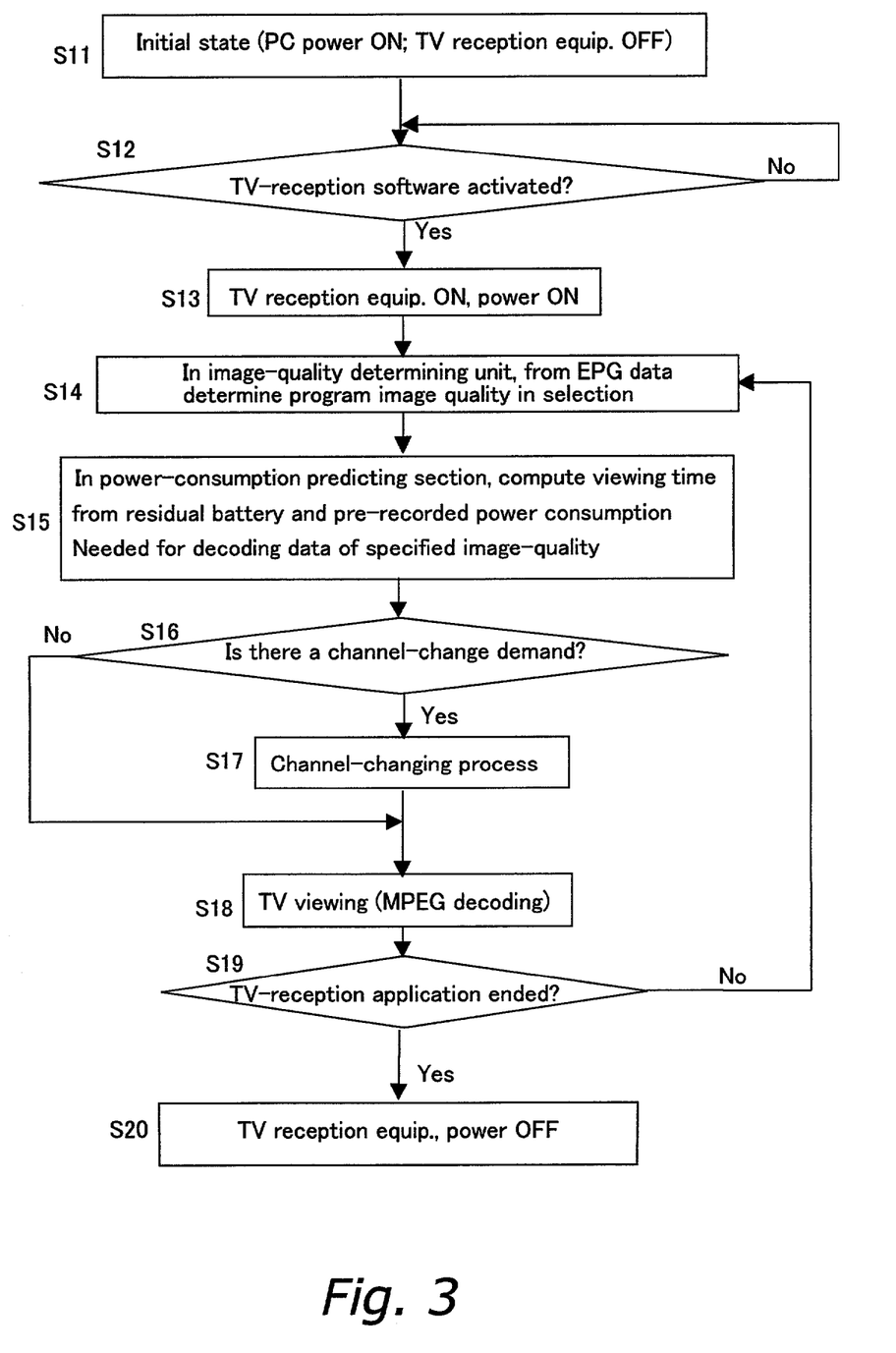
FIG. 3 is a flowchart thereof.

Operations set out in the first embodiment are indicated in the flowchart of FIG. 3.

Step S11, an initial state, is a state in which the power source for the notebook PC 10 is turned on, and the power source for the TV reception module 12 is off.

In Step S12, whether or not television-reception software from an application on the notebook PC 10 has been activated is judged. If it is determined that the television-reception software has been activated, then step S13 ensues.

In step S13, the power source for TV reception module 12 is put into the on state, and MPEG data is output by carrying out a demodulation process on the received data signal.

In step S14, EPG information multiplexed in and fed from the MPEG data is extracted with the MPEG decoding unit 21, and in the image-quality determining unit 31 the image quality is determined from the EPG information. For example, being that in wireless digital broadcasting, programs are broadcast that differ in image quality between programs that are SDTV-correlative in image quality and programs that are HDTV-correlative in image quality, image-quality information is contained within the EPG information. It is therefore possible to determine image quality by analyzing the EPG information. Image-quality information determined by the image-quality determining unit 31 is transmitted to the potential-viewing-duration predicting unit 32.

In step S15, how long a program currently being received can continue to be watched is forecast based on the image-quality information determined by the image-quality determining unit 31 and on the remaining battery capacity. Herein, power consumption needed for decoding with the MPEG decoding unit 21 the respective data signals of SDTV and HDTV image quality is arranged as the first table 35.

Likewise, because the power consumption varies depending on the system operating state, electric power consumption for each operating state is stored beforehand in a second table 36. For example, because the power consumption varies simply by changing the size of the display window that displays the images being received, corresponding relationships between operating state and electric power consumption are stored ahead in the second table 36.

In devices such as notebook PCs that can run on batteries, it is common to provide functionality that detects and alerts a user as to remaining batter capacity. In the potential-viewing-duration predicting unit 32, for how much time viewing will be possible by image quality of each program that could be watched is calculated from the first table 35, the second table 36 and the remaining battery capacity.

Supposing for example that the battery remaining capacity is 1000 mAh, that the power consumption required in watching a program whose image quality is SDTV is 100 mA, that the power consumption required in watching a program whose image quality is HDTV is 400 mA, and that the power consumption by the system is 100 mA: Five hours' viewing time would be possible for watching the SDTV program, because 200 mA of power per hour would be needed, while 500 mA of power per hour would be required for watching the HDTV program, and therefore two hours' viewing time would be possible.

The potential viewing duration information generated by the potential-viewing-duration predicting unit 32 is sent out to the power control unit 37. If the potential viewing duration has gone below a predetermined value while an HDTV program is being watched, the power control unit 37 sends out a channel-change demand. In step S16 if it is judged that a there has been a channel-change demand, then step S17 ensues, and if it is judged that there is no channel-change demand, then step S18 ensues.

In step S17 the TV reception module 12 is notified to have the channel control unit 38 change the channel, and the TV reception module 12 makes a channel change.

In step S18 a decoding process is done on the MPEG data, for output via the speakers 41 and the display unit 42.

In step S19 it is judged whether or not a terminate process for the television-reception software has been instructed. If the termination process for the television-reception software has been instructed, then step S20 ensues; if the termination process for the television-reception software has not been instructed, then step S14 ensues. In step S20, the power source for the TV reception module 12 is put into the off state.

Thus, the image-quality determining unit 31 that determines the image quality (resolution) of a program, the potential-viewing-duration predicting unit 32 that from the power consumption required in watching the program having given image quality, and from the remaining battery capacity, calculates remaining potential viewing time, and the power control unit 37 for lowering the power consumption if the remaining time is slight, are furnished in the notebook PC 10 outfitted with the TV reception module 12, which in this way enables longer-term viewing even running on a battery. Although not illustrated within the flowchart of FIG. 3, at fixed times determining image quality, predicting power consumption, calculating potential viewing duration, and carrying out the channel-changing operation is even more efficacious.

The configuration as described above may be such that the image-quality determining unit 31 determines image quality utilizing EPG (electronic program guide) information synchronously multiplexed in and fed from the MPEG data; but determining the image quality by deciphering it directly from picture data currently being displayed on the display unit 42 is also possible.

Figure 4:
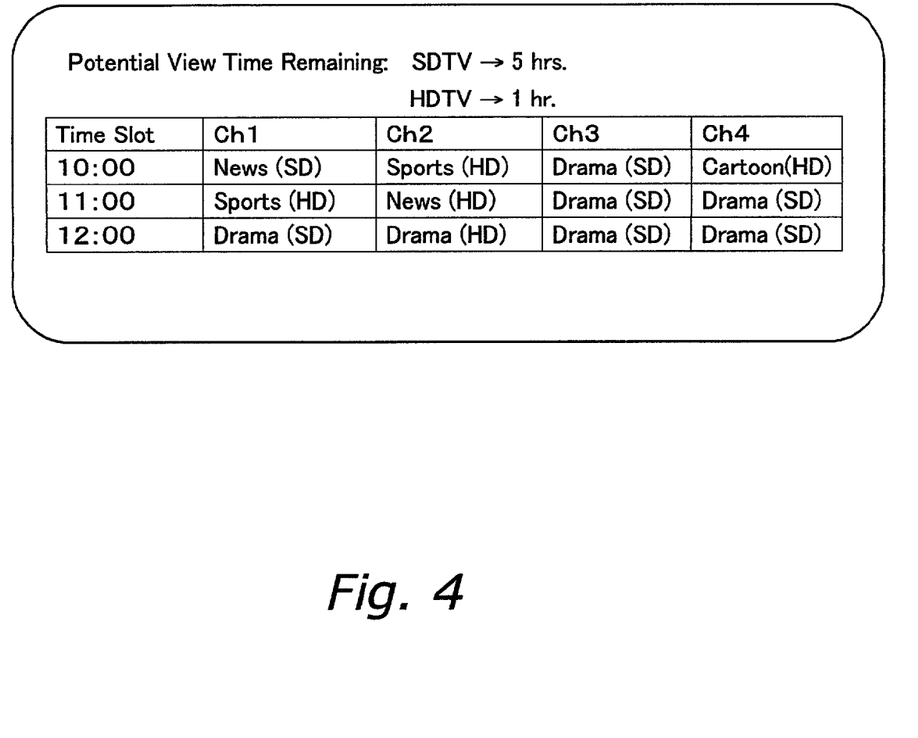
FIG. 4 is an explanatory view of an example of displaying potential view time.

Likewise, because it is contained in the EPG information for all channels, program information can be utilized by listing it in a display like in the television column of a newspaper. Accordingly, the user may be alerted to the potential viewing duration in instances in which SDTV and HDTV programs are watched, by displaying the duration simultaneously with the program, whereby the user is made aware of the power consumption and the potential view duration. An instance of how this would be displayed is illustrated in FIG. 4. Herein, channel-by-channel content and whether the program is SDTV or HDTV is listed corresponding to each time slot in the display; and according to the currently remaining capacity of the battery, the potential viewing duration for SDTV and HDTV respectively is displayed outside the box. By referring to this display, users may plan program viewing in accordance with the remaining capacity of the battery, to prevent the battery from cutting out in the middle of a program. Moreover, by referring to the EPG information, program-viewing plans to lengthen viewing time can be made automatically.

Second Embodiment

Figure 5:
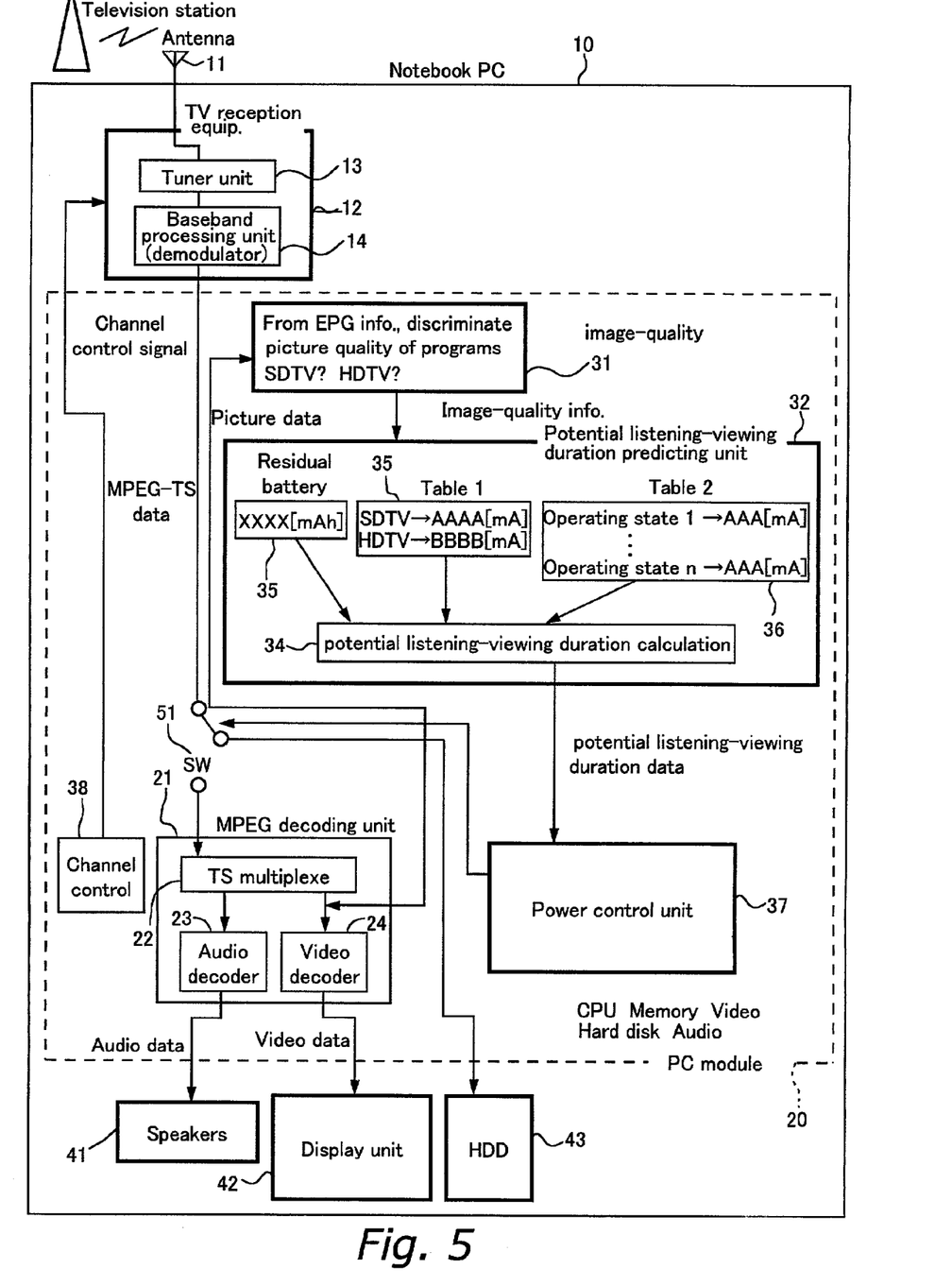
FIG. 5 is a block diagram of control operations in the second embodiment.

A control block diagram of a portable information-processing device in which a second embodiment of the present invention is adopted is shown in FIG. 5. Herein, likewise as with the first embodiment, an example in which a wireless-digital-television receiving module 12 for receiving television broadcasts is installed into a notebook PC 10 is illustrated.

For receiving data signals from digital terrestrial TV broadcasts, the notebook PC 10 is equipped with an antenna 11 and the TV reception module 12. The TV reception module 12 is equipped with a tuner unit 13 and a baseband processing unit 14, to demodulate into MPEG data modulated waves that are received.

The MPEG data demodulated by the TV reception module 12 is sent out to a PC module 20 that executes signal processing.

The PC module 20 is equipped with: an MPEG decoding unit 21 that restitutes MPEG data into image data; an image-quality determining unit 31 that determines the image quality of received data signals; a potential-viewing duration predicting unit 32; a power control unit 37; and a channel control unit 38; among other units.

The MPEG decoding unit 21 is equipped with: a TS multiplexer 22 that separates MPEG transport streams (MPEG-TS data) into audio information and video information; and an audio decoder 23 for decoding audio information and a video decoder 24 for decoding video information, among the separated information. Audio data decoded by the audio decoder 23 is output via speakers 41, and video data decoded by the video decoder 24 is displayed on a display unit 42 such as a liquid-crystal panel. Further, electronic program guide (EPG) information that is multiplexed into the MPEG-TS data is extracted by the MPEG decoding unit 21 and input to the image-quality determining unit 31.

Based on the EPG information sent out from the MPEG decoding unit 21, the image-quality determining unit 31 determines whether the image quality of a program being received is SDTV-correlative picture quality, or is HDTV-correlative picture quality. Picture-quality information determined by the image-quality determining unit 31 is input to the potential-viewing-duration predicting unit 32.

The potential-viewing-duration predicting unit 32 is equipped with a residual-battery-information acquisition unit 33 that acquires remaining battery capacity information, and a potential-viewing-duration calculating unit 34. The potential-viewing-duration calculating unit 34, based on image-quality information input from the image-quality determining unit 31 and on remaining battery capacity information acquired by the residual-battery-information acquisition unit 33, calculates potential viewing duration for a program currently being received. Power consumption required for decoding in instances respectively in which the image quality is SDTV-correlative, and in which the image quality is HDTV-correlative, is stored in advance as a first table 35. Furthermore, power consumption based on each operating state is stored in a second table 36. The potential-viewing-duration predicting unit 32, then, refers to the first table 35 and the second table 36, and from the currently remaining battery capacity specifies a potential viewing duration. The potential viewing duration data calculated by the potential-viewing-duration calculating unit 34 is sent out to the power control unit 37.

The power control unit 37, based on the potential viewing duration information input from the potential-viewing-duration predicting unit 32, generates a control signal that is for lessening the power consumption; and if for example the potential viewing duration is under a predetermined value, the power control unit 37 is configured to output a channel-change demand for switching to video recording, which is a process that consumes less power.

The notebook PC 10 is furnished with a hard-disk drive (HDD) capable of storing the various sorts of data that MPEG data contains. The notebook PC 10 is configured so that MPEG-TS data from the TV reception module 12 is input via a switch 51 to either the MPEG decoding unit 21 or the HDD 43. The configuration may be such that, if the remaining battery capacity is slight, by changing over the switch 51 in response to a demand from power control unit 37 to switchover to video recording, video recording-a process that consumes less power-will be carried out.

Figure 6:
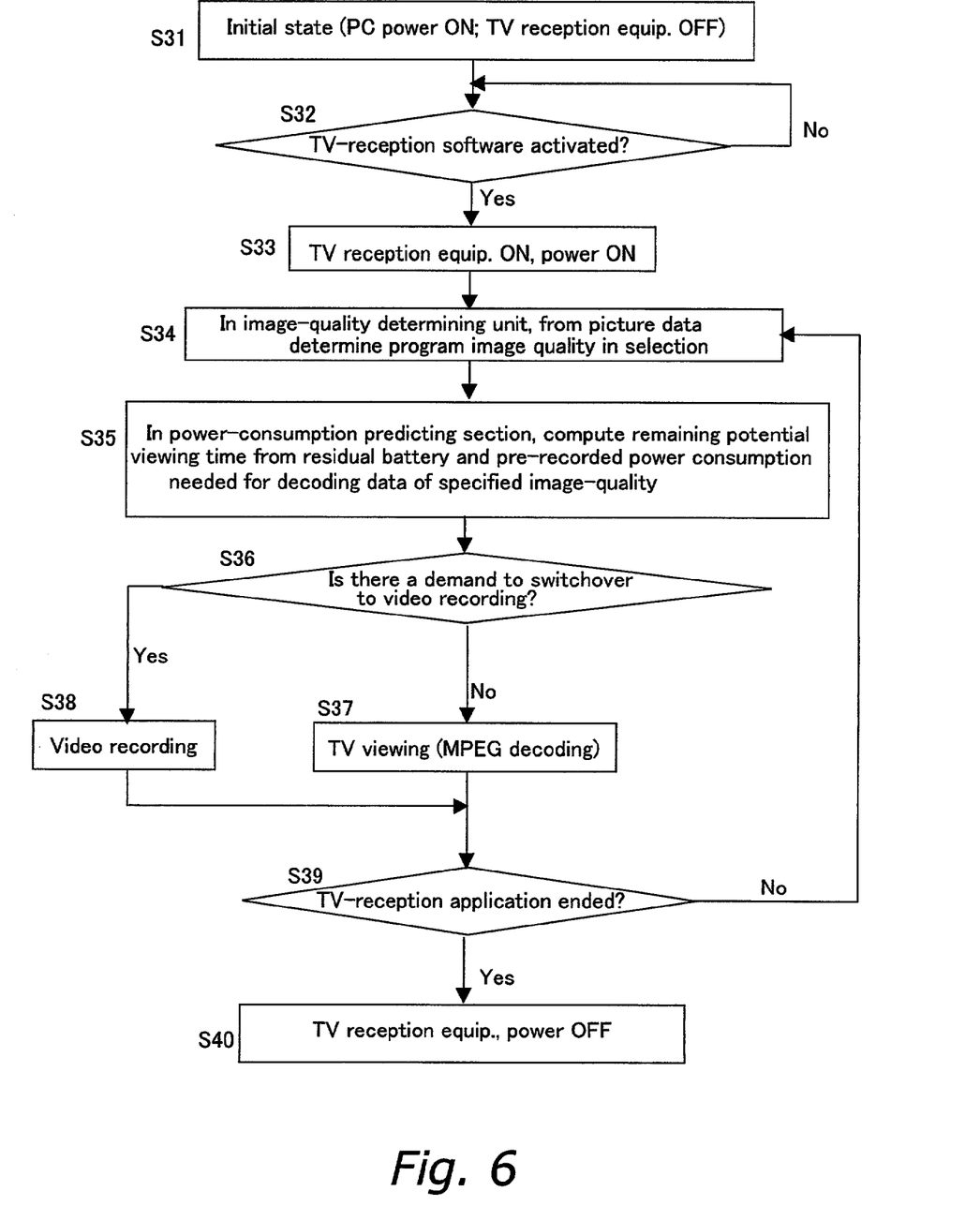
FIG. 6 is a flowchart thereof.

Operations set out in the second embodiment are indicated in the flowchart of FIG. 6.

Step S31, an initial state, is a state in which the power source for the notebook PC 10 is turned on, and the power source for the TV reception module 12 is off.

In Step S32, whether or not television-reception software from an application on the notebook PC 10 has been activated is judged. If it is determined that the television-reception software has been activated, then step S33 ensues.

In step S33, the power source for TV reception module 12 is put into the on state, and MPEG data is output by carrying out a demodulation process on the received data signal.

In step S34, EPG information multiplexed in and fed from the MPEG data is extracted with the MPEG decoding unit 21, and in the image-quality determining unit 31 the image quality is determined from the EPG information. For example, being that in digital terrestrial TV broadcasting, programs are broadcast that differ in image quality between programs that are SDTV-correlative in image quality and programs that are HDTV-correlative in image quality, image-quality information is contained within the EPG information. It is therefore possible to determine image quality by analyzing the EPG information. Image-quality information determined by the image-quality determining unit 31 is transmitted to the potential-viewing-duration predicting unit 32.

In step S35, how long a program currently being received can continue to be watched is forecast based on the image-quality information determined by the image-quality determining unit 31 and on the remaining battery capacity. Herein, power consumption needed for decoding with the MPEG decoding unit 21 the respective data signals of SDTV and HDTV image quality, and power consumption required in order to record in the HDD 43 the respective data signals of SDTV and HDTV image quality, is arranged as the first table 35.

Likewise, because the power consumption varies depending on the system operating state, electric power consumption for each operating state is stored in a second table 36. For example, because the power consumption varies simply by changing the size of the screen that displays the images being received, corresponding relationships between operating state and electric power consumption are stored in the second table 36.

In devices such as notebook PCs that can run on batteries, it is common to provide functionality that detects and alerts a user as to remaining batter capacity. In the potential-viewing-duration predicting unit 32, for how much time viewing would be possible by image quality of each program that could be watched, and potential viewing duration and potential recording duration if the video-recording process is carried out in the HDD 43, are respectively calculated from the first table 35, the second table 36 and the remaining battery capacity.

Supposing for example that the battery remaining capacity is 1000 mAh; that the power consumption required in watching a program whose image quality is SDTV is 100 mA; that the power consumption required in watching a program whose image quality is HDTV is 400 mA; that the power consumption required in recording a program whose image quality is SDTV is 50 mA; that the power consumption required in recording a program whose image quality is HDTV is 200 mA; and that the power consumption by the system in its standard state is 100 mA: Five hours' viewing time would be possible for watching the SDTV program, because 200 mA of power per hour would be needed, while 500 mA of power per hour would be required for watching the HDTV program, and therefore two hours' viewing time would be possible. Likewise, as to the potential recording duration: 6.7 hours of recording would be possible if the image quality of the program is SDTV, because the per-hour power consumption would be 150 mA; while 3.3 hours of recording would be possible if the image quality of the program is HDTV, because the per-hour power consumption would be 300 mA.

The information on potential viewing duration and on potential recording duration generated by the potential-viewing-duration predicting unit 32 is sent out to the power control unit 37. If the potential viewing duration has gone below a predetermined value while an HDTV program is being watched, the power control unit 37 sends out a recording-switchover demand. In step S36 if it is judged that a there has been a recording-switchover demand, then step S37 ensues, and if it is judged that there is no recording-switchover demand, then step S38 ensues.

In step S37, a decoding process is done on the MPEG data, for output via the speakers 41 and the display unit 42.

In step S38, the switch 51 is changed over to the HDD 43 side, and a recording process that stores the MPEG-TS data just as it is-without decoding it-in the HDD 43 is executed.

In step S39 it is judged whether or not a terminate process for the television-reception software has been instructed. If the termination process for the television-reception software has been instructed, then step S40 ensues; if the termination process for the television-reception software has not been instructed, then step S34 ensues. In step S40, the power source for the TV reception module 12 is put into the off state.

Thus, if the potential viewing time has grown short, power consumption efficiency can be improved because power to the MPEG decoding unit 21 can be shut off by switching over to recording onto the HDD 43. This feature of at fixed times determining image quality, predicting power consumption, calculating potential viewing duration, and carrying out the switchover to recording operation proves even more efficacious.

A configuration for watching a program previously recorded in the HDD 43 if the battery's remaining capacity is low lets power to the TV reception module 12 be shut off, enabling the power consumption to be reduced.

By means of the present invention, battery cutoff while a digital broadcast is being received in portable information devices that run on batteries is eliminated is made not to occur.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A portable information-processing device comprising:
digital-broadcast reception means for receiving digital-broadcasting data signals;
signal-processing means for decoding into image data data signals received by said digital-broadcast reception means;
image-quality determining means for determining image quality of the data signals received by said digital-broadcast reception means;
remaining-capacity detection means for detecting remaining capacity of a battery supplying a source of electricity to the portable information-processing device;
optimal-operation specifying means for, based on determination results from said image-quality determining means and detection results from said remaining-capacity detection means, determining, at predetermined time intervals, the optimal operating state that should be currently selected; and
notification means for reporting the resulting determination by said optimal-operation specifying means.

2. A portable information-processing device, comprising:
digital-broadcast reception means for receiving digital-broadcasting data signals;
signal-processing means for decoding into image data data signals received by said digital-broadcast reception means;
image-quality determining means for determining image quality of the data signals received by said digital-broadcast reception means;
remaining-capacity detection means for detecting remaining capacity of a battery supplying a source of electricity to the portable information-processing device;
table-storing means for storing in advance a first table which correlates an image quality and a power consumption when viewing with said image quality, and a second table which correlates an operation state and a power consumption;

optimal-operation specifying means for, based on determination results from said image-quality determining means and detection results from said remaining-capacity detection means, determining, at predetermined time intervals, the optimal operating state that should be currently selected; and; and notification means for reporting the resulting determination by said optimal-operation specifying means.

3. The portable information-processing device set forth in claim 1, wherein said image-quality determining means determines image quality by referring to EPG information contained within the data signals received by said digital-broadcast reception means.

4. The portable information-processing device set forth in claim 1, wherein said image-quality determining means determines image quality from image data decoded by said signal-processing means.

5. A portable information-processing device comprising:
digital-broadcast reception means for receiving digital-broadcasting data signals;
signal-processing means for decoding into image data data signals received by said digital-broadcast reception means;
image-quality determining means for determining image quality of the data signals received by said digital-broadcast reception means;
remaining-capacity detection means for detecting remaining capacity of a battery supplying a source of electricity to the portable information-processing device;
optimal-operation specifying means for, based on determination results from said image-quality determining means and detection results from said remaining-capacity detection means, deciding, at predetermined time intervals, on an operating state for optimizing power consumption; and
a power control means for setting the portable information-processing device into the operating state decided on by said optimal-operation specifying means.

6. A portable information-processing device, comprising:
digital-broadcast reception means for receiving digital-broadcasting data signals;
signal-processing means for decoding into image data data signals received by said digital-broadcast reception means;
image-quality determining means for determining image quality of the data signals received by said digital-broadcast reception means;
remaining-capacity detection means for detecting remaining capacity of a battery supplying a source of electricity to the portable information-processing device;
optimal-operation specifying means for, based on determination results from said image-quality determining means and detection results from said remaining-capacity detection means, deciding, at predetermined time intervals, on an operating state for optimizing power consumption and for forecasting potential viewing duration based on determination results from said image-quality determining means and detection results from said remaining-capacity detection means, and if the forecast potential viewing duration is below a predetermined value, selects an operating state for receiving a lesser-power-consuming program of lower image quality; and
a power control means for setting the portable information-processing device into the operating state decided on by said optimal-operation specifying means.

7. A portable information-processing device, comprising:
digital-broadcast reception means for receiving digital-broadcasting data signals;
signal-processing means for decoding into image data data signals received by said digital-broadcast reception means;
image-quality determining means for determining image quality of the data signals received by said digital-broadcast reception means;
remaining-capacity detection means for detecting remaining capacity of a battery supplying a source of electricity to the portable information-processing device;
optimal-operation specifying means for, based on determination results from said image-quality determining means and detection results from said remaining-capacity detection means, deciding, at predetermined time intervals, on an operating state for optimizing power consumption, and from EPG information in programs, said digital-broadcast reception means can receive power consumption for each of the programs, and based on results of the forecasts, selects a program to be received; and
a power control means for setting the portable information-processing device into the operating state decided on by said optimal-operation specifying means.

8. A portable information-processing device, comprising:
digital-broadcast reception means for receiving digital-broadcasting data signals;
signal-processing means for decoding into image data data signals received by said digital-broadcast reception means;
image-quality determining means for determining image quality of the data signals received by said digital-broadcast reception means;
remaining-capacity detection means for detecting remaining capacity of a battery supplying a source of electricity to the portable information-processing device;
data storage means for storing data signals received by said digital-broadcast reception means; wherein optimal-operation specifying means forecasts potential viewing duration based on determination results from said image-quality determining means and detection results from said remaining-capacity detection means, and if the forecast potential viewing duration is below a predetermined value, suspends operation of said signal-processing means and selects a recording mode that stores data signals received by said digital-broadcast reception means into said data storage means, said optimal-operation specifying means, based on determination results from said image-quality determining means and detection results from said remaining-capacity detection means, deciding, at predetermined time intervals, on an operating state for optimizing power consumption; and
a power control means for setting the portable information-processing device into the operating state decided on by said optimal-operation specifying means.

9. A portable information-processing device, comprising:
digital-broadcast reception means for receiving digital-broadcasting data signals;
signal-processing means for decoding into image data data signals received by said digital-broadcast reception means;
image-quality determining means for determining image quality of the data signals received by said digital-broadcast reception means;

remaining-capacity detection means for detecting remaining capacity of a battery supplying a source of electricity to the portable information processing device;

data playback means for playing back predetermined image data; wherein: optimal-operation specifying means forecasts potential viewing duration based on determination results from said image-quality determining means and detection results from said remaining-capacity detection means, and if the forecast potential viewing duration is below a predetermined value, suspends operation of said digital-broadcast reception means and said signal-processing means, and selects a play mode which includes playing back image data by said data play back means and displaying on a display means, said optimal-operation specifying means, based on determination results from said image-quality determining means and detection results from said remaining-capacity detection means, deciding, at predetermined time intervals, on an operating state for optimizing power consumption; and a power control means for setting the portable information-processing device into the operating state decided on by said optimal-operation specifying means.

10. The portable information-processing device set forth in claim 9, further furnished with data storage means for storing data signals received by said digital-broadcast reception means; wherein said data playback means play back data signals stored in said data storage means.

11. A portable information-processing device, comprising:

digital-broadcast reception means for receiving digital-broadcasting data signals;

signal-processing means for decoding into image data data signals received by said digital-broadcast reception means;

image-quality determining means for determining image quality of the data signals received by said digital-broadcast reception means;

remaining-capacity detection means for detecting remaining capacity of a battery supplying a source of electricity to the portable information-processing device;

table-storing means for storing in advance a first table which correlates an image quality and a power consumption when viewing with said image quality, and a second table which correlates an operation state and a power consumption;

optimal-operation specifying means for obtaining the power consumption which corresponds to a plurality of selectable image qualities from said first table, forecasting a potential viewing duration based on the obtained power consumption, a determination result from said image-quality determining means and a determination result from said remaining-capacity detection means, and obtaining an optimal operating state, at predetermined time intervals, corresponding to the forecasted potential viewing duration; and a power control means for setting the information-processing device into the operating state decided on by said optimal operation specifying means.

12. A method for maximizing output efficiency of a device, comprising:

calculating a potential duration of output from the device based on output quality and power capacity of the device; and producing the output in an optimal operating state, at predetermined time intervals, based on the calculated potential duration.

13. A portable information processing device, comprising:

a digital-broadcast unit adapted to receive digital-broadcasting data signals to decode into image data the received data signals;

a potential duration predicting unit adapted to determine image quality of the received signals and detect remaining capacity of a battery supplying power to the device; and a power control means for setting the information-processing device into an optimal operating state based on the remaining capacity of the battery and the image quality.

* * * * *

UNITED STATES PATENT AND TRADEMARK OFFICE
CERTIFICATE OF CORRECTION

PATENT NO. : 7,142,204 B2 Page 1 of 1
APPLICATION NO. : 10/125517
DATED : November 28, 2006
INVENTOR(S) : Shinichi Shiotsu et al.

It is certified that error appears in the above-identified patent and that said Letters Patent is hereby corrected as shown below:

On Title Page Item -56- (U.S. Patent Documents), Line 6, change "Siwinsi" to --Siwinski--.

On Title Page Item -57- Line 8, after "component" insert --;--.

Column 10, Line 54, after "image" delete "data".

Column 11, Line 6, after "selected;" delete "and;".

Signed and Sealed this

Eighth Day of May, 2007

JON W. DUDAS
*Director of the United States Patent and Trademark Office*